Aug. 22, 1933.  H. A. HILLE  1,923,538
BRAKE EQUALIZING SYSTEM
Filed Oct. 1, 1930
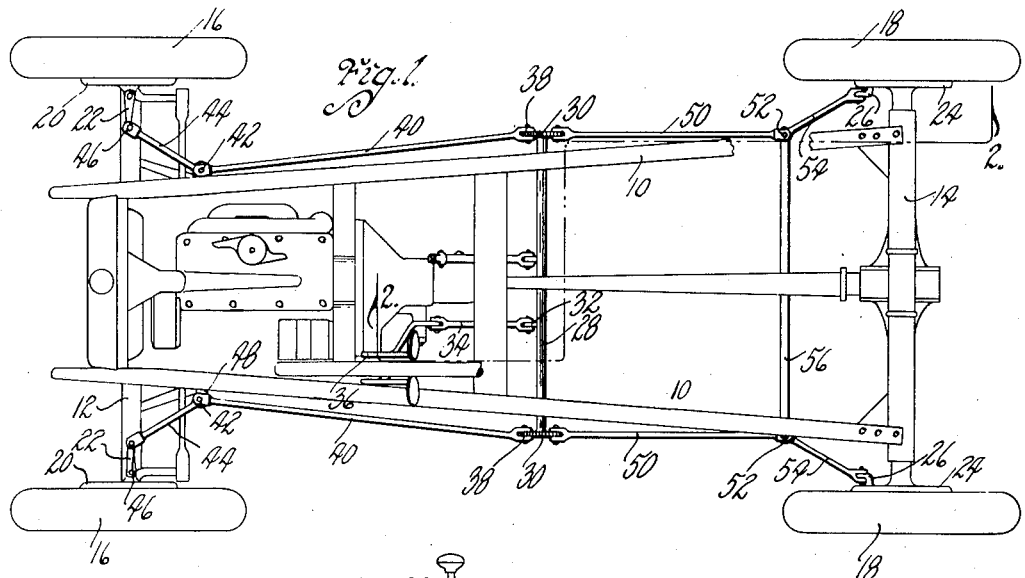
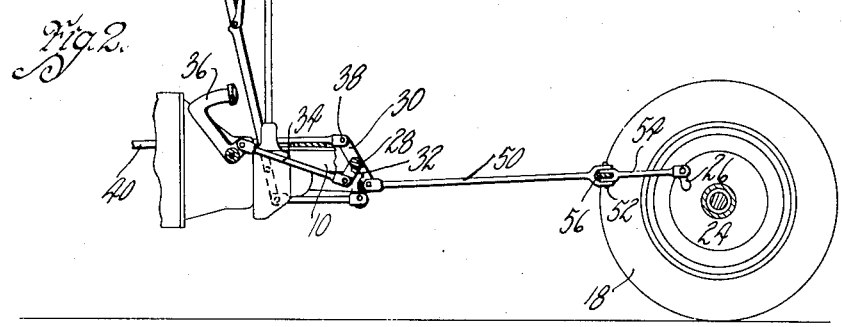
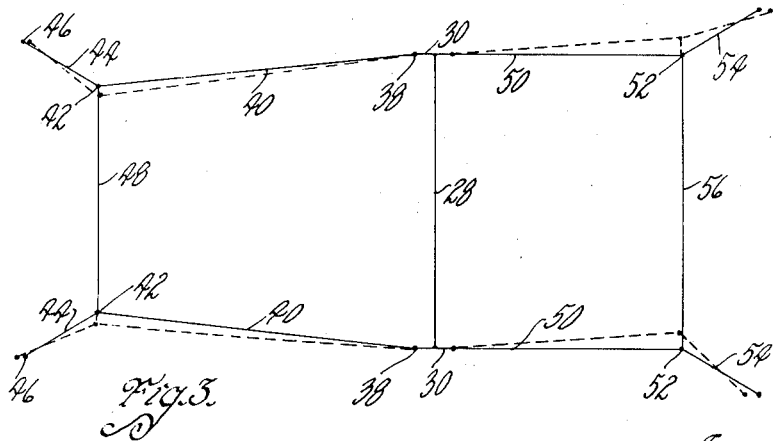
Inventor
Hans A. Hille
By Bair, Freeman & Sinclair
Attorneys
Witness
Edw. Saley Patented Aug. 22, 1933

1,923,538

UNITED STATES PATENT OFFICE 1,923,538

BRAKE EQUALIZING SYSTEM

Hans A. Hille, Des Moines, Iowa

Application October 1, 1930. Serial No. 485,662

1 Claim. (Cl. 188—204)

The object of this invention is to provide a brake equalizing system or apparatus of simple and inexpensive construction, and particularly designed to obviate the difficulty which often arises in the operation of brakes of motor vehicles due to the fact that it is difficult to maintain the brakes of different wheels in such condition that they will operate uniformly.

A further object and purpose of my invention is to provide a brake equalizing apparatus which can be applied to a motor vehicle with a minimum modification of the ordinary structure and which can be employed as an attachment for equalizing the brakes on the various wheels of the vehicle in such manner that the maximum of braking effect may be secured and the danger of accidents resulting from improper brake application may be reduced to a minimum.

With these and other objects in view, my invention consists in the construction, arrangement and combination of the various parts of my device, whereby the objects contemplated are attained, as hereinafter more fully set forth, pointed out in my claim, and illustrated in the accompanying drawing, in which:

Figure 1 is a plan view of the chassis of a motor vehicle equipped with my improved brake equalizing system.

Figure 2 is a longitudinal section of portions of the apparatus on the line 2—2 of Figure 1.

Figure 3 is a diagrammatic plan view illustrating the method of operation of the equalizing system.

In the drawing I have illustrated a portion of a motor vehicle of ordinary construction including a frame 10, a front axle assembly 12, and a rear axle assembly 14. On the front axle assembly are mounted the supporting wheels 16 and on the rear axle assembly are mounted the supporting wheels 18.

Associated with the forward wheels 16 of the vehicle are brakes 20, each having a brake operating lever 22 which projects toward the median line of the vehicle. Associated with the rear wheels 18 are brakes 24, each having a brake operating lever 26 projecting therefrom.

At a suitable position and arranged substantially midway of the length of the vehicle is a brake control shaft 28 which is mounted transversely and journaled in the frame 10. At its ends the control shaft 28 is provided with rigidly mounted cross heads 30 which preferably are located outside of the frame 10.

The control shaft 28 also is formed with a downwardly extending crank arm 32 between its ends and said crank arm is pivotally connected by a link 34 with a foot brake lever 36 suitably fulcrumed for operation in the usual manner.

To the upper end of each cross head 30 is pivotally attached at the point 38 a link 40 which extends forwardly and is pivotally connected at the point 42 with another link 44. Each link 44 is pivotally connected at its forward end at the point 46 to one of the brake operating levers 22.

A transverse connecting rod 48 is provided which extends across the frame and is pivotally attached at its ends to the pivots 42 which form the connecting means between the links 40 and 44 at opposite sides of the vehicle. The connecting rod 48 is of less length than the distance between the rear ends of the links 40 and also of less length than the distance between the forward ends of the links 44. In other words, the pivot points 42 are relatively closer together than the other pivot points of the links 40 and 44 whereby said links are inclined inwardly toward the median line of the frame from the points of their outermost pivotal connections.

To the lower ends of the cross heads 30 are pivotally attached a pair of links 50 which extend rearwardly and are pivotally connected at the points 52 to other links 54. The links 54 are pivotally connected at their rear ends to the brake operating levers 26 of the rear brakes 24.

A transverse connecting rod 56 is provided which is pivotally connected at its ends to the pivot points 52 in a manner similar to the connection of the rod 48. The connecting rod 56 is of less length than the distance between the rear pivot points of the links 54 so that said links 54 are arranged at oblique angles relative to the median line of the frame.

In the use of the ordinary types of brake mechanisms for motor vehicles it is well known that the brakes frequently get out of adjustment and when this occurs the brake bands on a pair of wheels, such as the two front wheels or the two rear wheels, are not uniformly tightened and applied when the brake levers are manipulated for applying the brakes. This condition results in unsatisfactory braking effect on the vehicle wheels and also frequently leads to accidents which may be occasioned by causing a spinning of one wheel or a skidding or side-sway when the brakes are thus unevenly applied. It is to overcome this unsatisfactory condition and to provide a simple and yet efficient means for equalizing the pull on the brake rods that I have made my present invention.

By means of the inclined links pivotally connected in pairs between the control shaft 28 and the respective brakes of a pair, either front or rear, and connecting these pivoted pairs of links by a connecting rod such as 48 or 56, I provide an equalizing leverage on the brake bands whereby one brake of a pair pulls against the other in case they are not uniformly adjusted.

For example, when the control shaft 28 is turned on its axis by pressure on the foot pedal 36, there is a rearward pull on the links 40 which is transmitted to the links 44 and through them to the brake operating levers 22 for applying the front brakes 20. If the brake 20 on the left hand forward wheel 16 first comes into operative engagement by tightening of the brake band on its drum, a pulling force will be exerted on the transverse connecting rod 48 which will cause it to swing to the left as indicated by dotted lines in Figure 3 until the right hand brake band is caused to engage. This action will equalize the braking effect of the two forward brakes 20 so that the brakes will act uniformly on the two forward wheels.

On the other hand, if the right hand brake of the pair should engage first, the connecting rod will be shifted to the right and exert an extra pull on the left hand brake so that the two brakes will be uniformly applied. This condition is illustrated by dotted lines in Figure 3 with respect to the action of the connecting rod 56 on the rear brakes 24.

The clevis connections with the ends of the cross heads 30 at the rear ends of the links 40 and at the forward ends of the links 50 are loose enough to permit movement of the links to the dotted line positions. The rear ends of the links 54 have similar clevis connections.

It is understood that my improved equalizing system may be applied either to a two-wheel brake system or a four-wheel brake system, and that it may be used in connection with either a foot brake of the ordinary service type, or a hand brake of the emergency type in cases where the emergency brake is applied to the vehicle wheels and not to the transmission.

It is also to be understood that the transverse connecting rods 48 and 56 may be secured to the respective links at any suitable position or location which is most convenient to a particular type or make of vehicle.

It will be observed that in the drawing I have illustrated the links 40 as well as the links 44 of the foot brakes as being inclined and that as to the rearward brakes I have illustrated the links 54 only as being inclined, the links 50 being substantially parallel.

From this selective arrangement it will appear that various modifications as to the position, arrangement and length of the various links may be employed. The principal feature of the invention is the pivoted arrangement of a pair of links on either side of the vehicle and the pivotal connection of these links by a transverse connecting rod which is of less length than the points of pivotal attachment of the links to the brake operating levers. It is this arrangement that causes a shifting or lateral swinging movement of the pivot point between the respective links to compensate for an unequal adjustment of the brakes of a pair, whereby the brakes are caused to operate uniformly in spite of such lack of uniform adjustment.

The use of my improved brake equalizing system will result in eliminating the necessity for frequent adjustment of the brakes because the uniform adjustment of the brakes of a pair will not be so important when my equalizing system is used.

I claim as my invention:—

In a structure of the class described, a chassis frame, front and rear pairs of supporting wheels therefor, a brake associated with each one of said wheels, a control link for each of said brakes having pivoted universal motion, an intermediate transverse shaft rotatably mounted on said frame, cross heads on said rotatable shaft, two front and two rear links universally pivoted to each of said cross heads and respectively to the control links of the brakes of said front and rear pairs of supporting wheels so that rotation of said shaft will operate said control links for controlling said brakes and two transverse connecting rods pivoted to said front and rear links adjacent the points where the control links connect with the front and rear links, said transverse connecting rods being of less length than the distance between said front and rear links so that when the parts are operated for applying the brakes the transverse connecting rods tend to individually equalize the pull on the brakes of each pair of wheels.

HANS A. HILLE.